United States Patent
Wolleb et al.

[11] Patent Number: 5,958,650
[45] Date of Patent: Sep. 28, 1999

[54] COMPLEX POLYMETHINE DYES AND THEIR USE

[75] Inventors: Heinz Wolleb, Marly; Beat Schmidhalter, Giffers, both of Switzerland

[73] Assignee: Ciba Specialty Chemicals Corporation, Tarrytown, N.Y.

[21] Appl. No.: 08/994,881

[22] Filed: Dec. 19, 1997

[30] Foreign Application Priority Data

Dec. 20, 1996 [CH] Switzerland ............... 3140/96

[51] Int. Cl.⁶ ................................................ G11B 7/24
[52] U.S. Cl. ............... 430/270.19; 430/945; 430/270.2; 430/270.21; 430/270.16
[58] Field of Search ................. 430/270.19, 270.16, 430/270.21, 270.2, 945; 734/723; 369/288, 284

[56] References Cited

U.S. PATENT DOCUMENTS 3,406,162 10/1968 Neier ........................... 260/145
4,553,976 11/1985 Rainsin et al. ................ 534/723

(List continued on next page.)

FOREIGN PATENT DOCUMENTS 0483387 5/1992 European Pat. Off. .
0528512 2/1993 European Pat. Off. .

(List continued on next page.)

OTHER PUBLICATIONS

Derwent Abst. 90–158612/21.
Derwent Abst. 86–057897/09.
Derwent Abst. 97–283904/26.
Derwent Abst. 90–103951/14.
Derwent Abst. 95–386878/50.
Derwent Abst. 84–117654/19.

*Primary Examiner*—Martin Angebranndt
*Attorney, Agent, or Firm*—Kevin T. Mansfield; Jacob M. Levine

[57] ABSTRACT

This invention relates to an optical recording medium, comprising a substrate, a recording layer and a reflecting layer, where the recording layer comprises at least one dye of formula

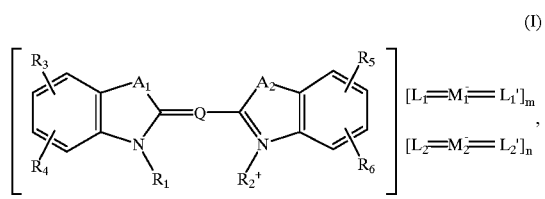

wherein $A_1$ and $A_2$ are each independently of the other $C(CH_3)_2$, O, S, Se, or CH=CH which is unsubstituted or substituted by $C_1$–$C_5$alkyl or benzyl;

$M_1$ and $M_2$ are each independently of the other $Cr^{3+}$ or $Co^{3+}$;

$L_1$ and $L_1'$ are each independently of the other a ligand of formula

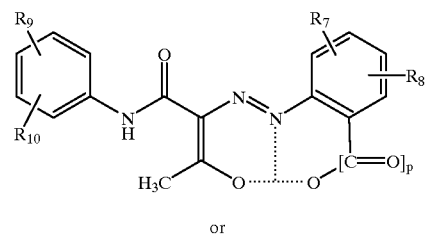

or

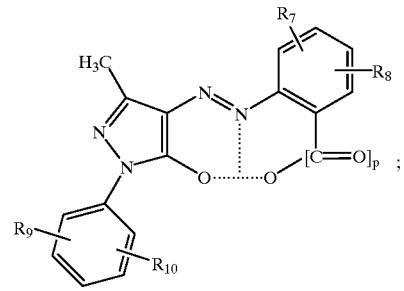

$L_2$ and $L_2'$ are each independently of the other and independently of $L_1$ and $L_1'$ a ligand of formula (II), (III) or

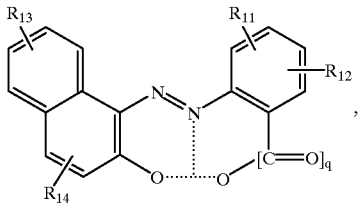

m is a number from 0.2 to 1.0; and n, depending on m, is a number from 0.0 to 0.8, so that the sum of m and n equals 1.0;

p and q are each independently of the other 0 or 1; and

Q is $CR_{15}$, $CR_{15}$—$CR_{16}$=$CR_{17}$ or $CR_{15}$—$CR_{16}$=$CR_{17}$—$CR_{18}$=$CR_{19}$.

This invention also claims the dyes of formula (I) themselves as well as a process for optically recording, storing or reproducing information using a recording medium of this invention, recording or reproduction preferably being carried out at the wavelength range from 600 to 800 nm.

19 Claims, No Drawings

U.S. PATENT DOCUMENTS

| | | | |
|---|---|---|---|
| 4,626,496 | 12/1986 | Sato | 430/270 |
| 5,204,220 | 4/1993 | Yanagisawa et al. | 430/275 |
| 5,219,707 | 6/1993 | Namba | 430/270 |
| 5,330,542 | 7/1994 | Maeda et al. | 8/639 |
| 5,426,015 | 6/1995 | Chapman et al. | 430/275 |
| 5,547,728 | 8/1996 | Cunningham et al. | 428/64.1 |

FOREIGN PATENT DOCUMENTS

| | | | |
|---|---|---|---|
| 0649884 | 4/1995 | European Pat. Off. | |
| 0676751 | 10/1995 | European Pat. Off. | |
| 0717402 | 6/1996 | European Pat. Off. | |
| 1463629 | 3/1967 | France | |
| 3-51182 | 3/1991 | Japan | |
| 3051182 | 3/1991 | Japan | |
| 3150189 | 6/1991 | Japan | |
| 3224793 | 10/1991 | Japan | |
| 4308791 | 10/1992 | Japan | |
| 5147356 | 6/1993 | Japan | |
| 0901934 | 1/1997 | Japan | |
| 316749 | 12/1956 | Switzerland | 534/723 |
| 974383 | 11/1964 | United Kingdom | 534/723 |
| 2162332 | 1/1986 | United Kingdom | |
| 9322142 | 11/1993 | WIPO | | ns5,958,650

COMPLEX POLYMETHINE DYES AND THEIR USE

The field of the present invention is the optical recording of information on write-once recording media, where the information pits are distinguished by the different optical properties of a colourant at recorded and unrecorded sites. This technology is referred to commonly as WORM and includes also, for example, CD-R or DVD-R.

Compacts discs (CD-R) which are recordable at a wavelength of 770 to 830 nm are known from "Optical Data Storage 1989", Technical Digest Series, Vol. 1, 45 (1989). According to to the Orange Book Standard, the medium must, inter alia, have a base reflectivity of 65% and more at the recording wavelength. Recording media can be, for example, cyanine dyes or azo metal complexes.

As a result of the use of more recent compact and powerful red diode lasers which emit in the range from 630 to 690 nm, it is possible in principle to improve the data packing density from 5 to 8 times, since the track spacing (distance between 2 turns of the information track) and the size of the pits can be reduced to about half those of a conventional CD. The requirements for DVD-R systems are to be found in the Violet Book Standard.

However, this places substantially higher requirements on the recording layer to be used, such as high refractive index, high daylight stability and stability at low laser radiation (when reading) coupled with high sensitivity to high-energy laser radiation (when recording) as well as optimal position and form of the absorption bands in the solid state. This is complicated in particular by the problem that the absorption in the solid state usually differs substantially and unforeseeably from the absorption in solution. To find a compromise between the different properties of different dyes, the attempt was made to use, inter alia, mixtures of several dye components.

EP-649'884 discloses the use of mixtures having specific optical properties in the range from 780 to 790 nm for optical recording. These mixtures consist of special nonionic azopyridone dyes and at least one second dye, the second dye used in one Example being the salt consisting of a cyanine dye cation and a bis-azopyridone nickel anion known from U.S. Pat. No. 5,426,015. Both dyes are deep blue and the mixture has a broad band absorption.

U.S. Pat. No. 5,547,728 discloses optical recording layers which also have specific optical properties at 780 nm and which consist of mixtures of cationic cyanine dyes (in particular indodicarbocyanine dyes) and nonionic or cationic formazan dyes metalised with nickel. In the Examples the mixture ratio varies between 85:15 and 50:50.

EP-483387 discloses optical recording media with light-stable recording layers which consist of mixtures of cationic cyanine dyes and neutral or positive heterocyclic blue azo dyes, the azo dye indicated being, for example, nickel-di-[2-(5'-chloropyrid-2'-yl)-azo-5-diethylamino-phenolate]. These dye mixtures absorb in the range from 600 to 800 nm.

EP-676'751 discloses optical recording media having a reflection of at least 65% at 770 to 830 nm and of at least 15% at 630 to 690 nm and which comprise mixtures of components, one of which absorbs at less than 630 nm and the other at 630 to 900 nm. Components mentioned are cyanine dyes as well as azo metal complexes. Disclosed are many combinations, including mixtures predominantly consisting of a nonionic heterocyclic azo metal complex to which a small amount of a ionic cyanine dye is added.

JP-3/51'182 describes optical recording media comprising a cyanine dye cation as well as an electrophilic azo metal complex anion which is substituted by nitro groups or halogen groups in a phenyl ring and also by amine groups or amide groups in a naphthyl ring. Azo metal complex anions are disclosed as being phenolazonaphthene chromium complexes. However, it has been found that these complexes have the disadvantage of having a high secondary absorption in the range of 600 to 800 mn in optical recording media. Moreover, it cannot be determined from the description what structures the "cyanine" cations might consist of.

U.S. Pat. No. 4,626,496 describes optical recording media comprising "double salts" of organic dye cations and metal complex anions as well as their mixtures with another organic dye. Described are as organic dye cations e.g. polymethines, as metal complex anion e.g. nickel(III)-bis-(3,4,6-trichlorophenyl-1,2-dithiolate), and as other dyes e.g. polymethine dyes. According to the description, the metal complex anions should preferably have a bathochrome absorption compared to the dye cation. Additionally, these mixtures have a broad band absorption with a flat long-wave absorption edge and are unsuitable for CD-R, as is disclosed U.S. Pat. No. 5,426,015.

JP-03/224793 discloses optical recording media, the recording layer of which consists of a mixture of a naphthopyrrole cyanine dye and of an additional dye having an absorption maximum at shorter wavelength. It is known from JP-03/150189 that these naphthopyrrole cyanine dyes have better durability than comparable benzothiazole cyanine dyes. As additional dye, JP-03/224793 discloses only cyanines, the absorption maximum of which should preferably be hypsochromically shifted by at least 20 nm, but whose wavelength should be longer than 650 nm. Anions disclosed are, inter alia, nickel tetrathiolate complexes which are known from U.S. Pat. No. 5,204,220 as quenchers and light stabilisers for naphthopyrrole cyanine dyes.

JP-05/147356 discloses optical recording media, the light absorbing layer of which consists of a cyanine perchlorate and an ammonium metal polythiolate complex or phosphonium metal polythiolate complex. They are said to have improved durability.

JP-08/310129 discloses optical recording media, the recording layer of which consists of a mixture of an indoleninepentamethine cyanine dye and of a 1-dehydro-2-(1'-pyrazolyl)-4-(4"-dialkylaminophenyl)-imino-5-phenylimidazole transition metal complex. Their reproduction properties are said to have improved durability.

Furthermore, JP-01/229'694 discloses the use of specific cyanine mixtures for optical recording, and JP-61/8'384 discloses optical recording media which comprise a cyanine dye and additionally a salt consisting of a cyanine dye cation and of a tetrathio-coordinated transition metal anion.

JP-04/308791 discloses optical recording media, the laser radiation-absorbing dye of which consists of mixtures of at least 3 components of the same chromophore, including specific cyanine or azo metal complex chromophores. The components of this mixture should conveniently have absorption maxima differing by not more than 50 nm.

Finally, other mixtures are also known from EP-528'512, wherein two cyanine cations of different absorption maxima are used and, to mask the unwanted short-wave absorption of the cyanines, a compound is additionally added which preferably absorbs at 400 to 500 nm, for example 4-nitro-4'-aminoazobenzene.

However, it has been found that also the known recording layers consisting of several components still do not possess the desired properties to a completely satisfying extent. In particular, the half width of the absorption bands, the position and steepness of the longer-wave absorption edge, the absorption above this, the sensitivity, the change of the refractive index during recording, or the light stability, or even several of these parameters together, do not meet the demands, or only to an unsatisfactory degree.

Very surprisingly, it has now been found that an optical recording medium having improved properties is obtained when the dyes used in the recording layer are cyanine dyes, the anions of which consist of specific azo metal complexes or specific mixtures of azo metal complexes. In addition to an improved compromise between high refractive index, sensitivity and, in particular, light stability and also position and form of the absorption bands in the solid state, the inventive dyes have a suitable amorphous morphology and an advantageous degradation temperature. During the recording process using a laser beam, the refractive index changes very much, and the recording may surprisingly be effected already at lower energy. Owing to the higher sensitivity and the favourable morphology which, advantageously, is substantially retained without any change in volume during recording, the pit formation can be better controlled. This also contributes advantageously to the increase of the data packing density as a less redundant code can be used.

Accordingly, this invention relates to an optical recording medium, comprising a substrate, a recording layer and a reflecting layer, where the recording layer comprises at least one dye of formula

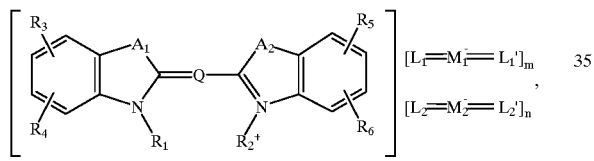

(I)

wherein $A_1$ and $A_2$ are each independently of the other $C(CH_3)_2$, O, S, Se, or CH=CH which is unsubstituted or substituted by $C_1$–$C_5$alkyl or benzyl;

$M_1$ and $M_2$ are each independently of the other $Cr^{3+}$ or $Co^{3+}$;

$L_1$ and $L_1'$ are each independently of the other a ligand dianion of formula

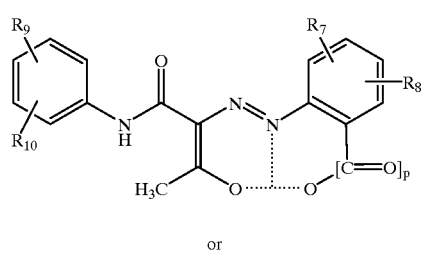

(II)

or

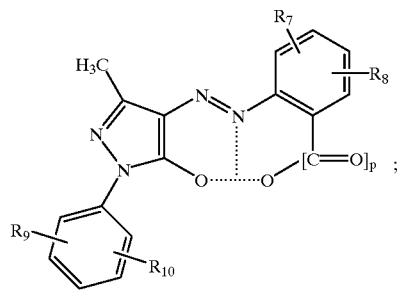

(III)

$L_2$ and $L_2'$ are each independently of the other and independently of $L_1$ and $L_1'$ a ligand dianion of formula

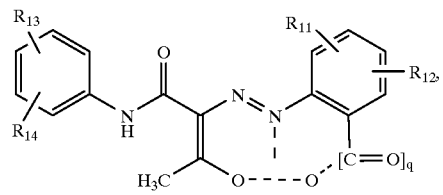

(IV)

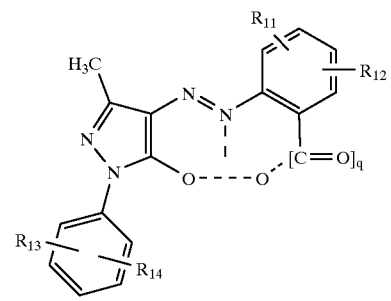

(V)

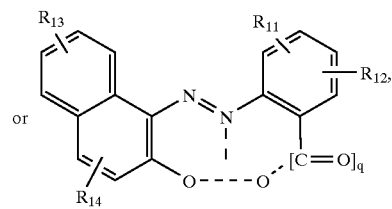

(VI)

or m is a number from 0.2 to 1.0; and n, depending on m, is a number from 0.0 to 0.8, so that the sum of m and n equals 1.0;

p and q are each independently of the other 0 or 1;

Q is $CR_{15}$, $CR_{15}$—$CR_{16}$=$CR_{17}$ or $CR_{15}$—$CR_{16}$=$CR_{17}$—$R_{18}$=$CR_{19}$;

$R_1$ and $R_2$ are each independently of the other $C_1$–$C_{12}$alkyl or $C_1$–$C_{12}$alkenyl, each of which is unsubstituted or mono- or polysubstituted by halogen, hydroxy, $C_1$–$C_{12}$alkoxy or cyano, or $C_6$–$C_{12}$aryl or $C_7$–$C_{12}$aralkyl, each of which is unsubstituted or substituted by $R_{20}$ or by $R_{20}$ and $R_{21}$;

$R_3$, $R_4$, $R_5$, $R_6$, $R_7$, $R_8$, $R_9$, $R_{10}$, $R_{11}$, $R_{12}$, $R_{13}$ and $R_{14}$ are each independently of one another hydrogen, halogen, nitro, cyano, hydroxy, amino, $NHR_{22}$, $NR_{22}R_{23}$, $CONH_2$, $CONHR_{22}$, $CONR_{22}R_{23}$, $SO_2C_1–C_{12}$alkyl, $SO_2NH_2$, $SO_2NHR_{22}$, $SO_2NR_{22}R_{23}$, COOH, $COOR_{24}$, $NHCOR_{25}$, $NR_{24}COR_{25}$, $NHCOOR_{25}$, $NR_{24}COOR_{25}$, or $C_1–C_{12}$alkyl, $C_1–C_{12}$alkylthio or $C_1–C_{12}$which is unsubstituted or mono- or polysubstituted by halogen, hydroxy or cyano; or $R_3$ and $R_4$ and/or $R_5$ and $R_6$ together are 1,4-buta-1,3-dienylene which is unsubstituted or substituted by $R_{26}$ or by $R_{26}$ and $R_{27}$, so that naphthyl is formed with the shared phenyl;

$R_{15}$, $R_{16}$, $R_{17}$, $R_{18}$ and $R_{19}$ are each independently of one another hydrogen, halogen, $C_1–C_{12}$-alkoxy; $C_1–C_{12}$alkyl, $C_6–C_{12}$aryl, $C_7–C_{12}$aralkyl or $NR_{22}R_{23}$, each of which is unsubstituted or mono- or polysubstituted by halogen, hydroxy or cyano; or $R_{15}$, and $R_{17}$, $R_{16}$ and $R_{18}$ or $R_{17}$ and $R_{19}$ together are ethylene, ethylidene, propylene, propylidene, o-phenylene, α,2-benzylidene or 1,8-naphthylidene, each of which is unsubstituted or substituted by $R_{26}$ or by $R_{26}$ and $R_{27}$;

$R_{20}$ and $R_{21}$ are each independently of the other hydrogen, halogen, nitro, cyano, hydroxy, amino, $NHR_{22}$, $NR_{22}R_{23}$, $CONH_2$, $CONHR_{22}$, $CONR_{22}R_{23}$, $SO_2C_1–C_{12}$alkyl, $SO_2NH_2$, $SO_2NHR_{22}$, $SO_2NR_{22}R_{23}$, COOH, $COOR_{24}$, $NHCOR_{25}$, $NR_{24}COR_{25}$, $NHCOOR_{25}$, $NR_{24}COOR_{25}$, or $C_1–C_{12}$alkyl, $C_1–C_{12}$alkylthio or $C_1–C_{12}$alkoxy, each of which is unsubstituted or mono- or polysubstituted by halogen, hydroxy or cyano;

$R_{22}$ and $R_{23}$ are each independently of the other $C_1–C_{12}$alkyl or $C_2–C_{12}$alkenyl, each of which is unsubstituted or mono- or polysubstituted by halogen, hydroxy or $C_1–C_{12}$alkoxy, or $C_6–C_{12}$aryl or $C_7–C_{12}$aralkyl, each of which is unsubstituted or substituted by $R_{26}$, or by $R_{26}$ and $R_{27}$; or $R_{22}$ and $R_{23}$, together with the linking nitrogen atom, are pyrrolidine, piperidine, piperazine or morpholine, each of which is unsubstituted or substituted by one to four $C_1–C_4$alkyl, or carbazole, phenoxazine or phenothiazine, each of which is unsubstituted or substituted by $R_{26}$, or by $R_{26}$ and $R_{27}$;

$R_{24}$ and $R_{25}$ are each independently of the other $C_1–C_{12}$alkyl or $C_2–C_{12}$alkenyl, each of which is unsubstituted or mono- or polysubstituted by halogen, hydroxy or $C_1–C_{12}$alkoxy, or $C_6–C_{12}$aryl or $C_7–C_{12}$aralkyl, each of which is unsubstituted or substituted by $R_{26}$, or by $R_{26}$ and $R_{27}$;

$R_{26}$ and $R_{27}$ are each independently of the other halogen, nitro, cyano, hydroxy, $NR_{28}R_{29}$, $CONH_2$, $CONHR_{28}$, $CONR_{28}R_{29}$, $SO_2C_1–C_{12}$alkyl, $SO_2NR_{28}R_{29}$, COOH, $COOR_{30}$, $NHCOR_{31}$, $NHCOOR_{31}$, $NR_{30}COR_{31}$, $NR_{30}COOR_{31}$, or $C_1–C_1$ alkyl or $C_1–C_{12}$alkoxy, each of which is unsubstituted or mono- or polysubstituted by halogen;

$R_{28}$ and $R_{29}$ are each independently of the other hydrogen, $C_6–C_{12}$aryl, $C_7–C_{12}$aralkyl; $C_1–C_{12}$alkyl or $C_2–C_{12}$alkenyl, each of which is unsubstituted or mono- or polysubstituted by halogen, hydroxy or $C_1–C_{12}$alkoxy; or $R_{28}$ and $R_{29}$, together with the linking nitrogen atom, are pyrrolidine, piperidine, piperazine or morpholine, each of which is unsubstituted or substituted by one to four $C_1–C_4$alkyl, or carbazole, phenoxazine or phenothiazine; and $R_{30}$ and $R_{31}$ are each independently of the other $C_8–C_{12}$aryl, $C_7–C_{12}$aralkyl; $C_1–C_{12}$alkyl or $C_2–C_{12}$alkenyl, each of which is unsubstituted or mono- or polysubstituted by halogen, hydroxy or $C_1–C_{12}$alkoxy.

Alkyl or alkenyl can be straight-chain, branched, monocyclic or polycyclic. $C_1–C_{12}$Alkyl is therefore e.g. methyl, ethyl, n-propyl, isopropyl, n-butyl, sec-butyl, isobutyl, tert-butyl, cyclobutyl, n-pentyl, 2-pentyl, 3-pentyl, 2,2-dimethylpropyl, cyclopentyl, cyclohexyl, n-hexyl, n-octyl, 1,1,3,3-tetramethylbutyl, 2-ethylhexyl, nonyl, trimethylcyclohexyl, decyl, menthyl, thujyl, bornyl, 1-adamantyl, 2-adamantyl or dodecyl.

$C_2–C_{12}$Alkenyl is $C_2–C_{12}$alkyl which is mono- or polyunsaturated, wherein two or more double bonds may optionally be isolated or conjugated, for example vinyl, allyl, 2-propen-2-yl, 2-buten-1-yl, 3-buten-1-yl, 1,3-butadien-2-yl, 2-cyclobuten-1-yl, 2-penten-1-yl, 3-penten-2-yl, 2-methyl-1-buten-3-yl, 2-methyl-3-buten-2-yl, 3-methyl-2-buten-1-yl, 1,4-pentadien-3-yl 2-cyclopenten-1-yl, 2-cyclohexen-1-yl, 3-cyclohexen-1-yl, 2,4-cyclohexadien-1-yl, 1-p-menthen-8-yl, 4(10)-thujen-10-yl, 2-norbornen-1-yl, 2,5-norbornadien-1-yl, 7,7-dimethyl-2,4-norcaradien-3-yl or the different isomers of hexenyl, octenyl, nonenyl, decenyl or dodecenyl.

$C_7–C_{12}$Aralkyl is typically benzyl, 2-benzyl-2-propyl, β-phenyl-ethyl, 9-fluorenyl, α,α-dimethyl-benzyl, ω-phenylbutyl or ω,ω-dimethyl-ω-phenylbutyl.

$C_6–C_{12}$Aryl is typically phenyl, naphthyl, biphenylyl or 2-fluorenyl.

$C_1–C_{12}$Alkoxy is O—$C_1–C_{12}$alkyl.

Halogen is chloro, bromo, fluoro or iodo. Fluoro or chloro are preferred.

$C_1–C_{12}$Alkyl or $C_2–C_{12}$alkenyl, each of which is mono- or polysubstituted by halogen, hydroxy, $C_1–C_{12}$alkoxy or cyano is typically 2-chloroethyl, trifluoromethyl, 2,2,2-trifluoroethyl, trichlorovinyl, perfluorododecyl, 2-hydroxyethyl, 2-methoxyethyl, 2-ethoxyethyl, 2-butoxyethyl, 2,3-dihydroxypropyl, 2,3-dimethoxypropyl, 2,3-dimethoxypropyl or 2-cyanoethyl, preferably trifluoromethyl, 2-hydroxyethyl, 2-methoxyethyl, 2-ethoxyethyl or 2-cyanoethyl.

The recording layer preferably comprises at least 60% by weight, based on the weight of the recording layer, of at least one compound of formula (I).

In addition to the compounds of formula (I), the novel recording medium can contain one or more salts, for example ammonium chloride, ammonium bromide, pentadecylammonium chloride, sodium chloride, potassium bromide, sodium sulfate, sodium iodide, sodium methylsulfonate or sodium methylsulfate, the ions of which may originate e.g. from the components used. If present, these additional salts are preferably colourless and are present in amounts of less than 20% by weight, based on the total weight of the recording layer, particularly preferably in amounts of up to 10% by weight, very particularly preferably in amounts of up to 1% by weight.

However, the novel recording medium preferably essentially does not contain any additional inorganic salts.

In addition to the compounds of formula (I), the recording layer of the novel recording medium can also contain additional ionic dyes, for example a fluoride, chloride, bromide, iodide, perchlorate, periodate, carbonate, hydrogencarbonate, sulfate, hydrogen sulfate, phosphate, hydrogenphosphate, dihydrogenphosphate, hexafluorophosphate, tetrafluoroborate, hexafluoroantimonate, acetate, oxalate, mesylate, triflate, tosylate, methyl sulfate, phenolate or benzoate of a cyanine of formula (VII)

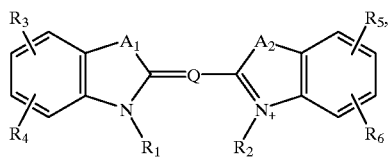

or the $Li^+$, $Na^+$, $K^+$, $[Mg^{2+}]_{1/2}$, $[Ca^{2+}]_{1/2}$, methylammonium, ethylammonium, pentadecylammonium, isopropylammonium, dicyclohexylammonium, tetramethylammonium, tetraethylammonium, tetrabutylammonium, benzyltrimethylammonium, benzyltriethylammonium, methyltrioctylammonium, tridodecylmethylammonium, tetrabutylphosphonium, tetraphenylphosphonium, butyltriphenylphosphonium or ethyltriphenylphosphonium salt of a metal azo complex of formula (VIII)

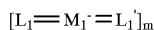

or (IX)

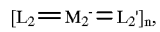

all symbols being defined as stated above. Where present, the additional ionic dyes are present in amounts of preferably less than 20% by weight, based on the total weight of the recording layer.

However, the novel recording medium essentially does not contain any additional ionic dyes.

If required, additional nonionic dyes may also be added, but only in amounts of preferably at most 20% by weight, particularly preferably of at most 5% by weight, based on the recording layer. However, it is very particularly preferred not to add any additional dye. If added, the dyes expediently have an absorption maximum which is hypsochromically shifted relative to the dye of formula (I).

The novel recording medium can also contain additives which modify its properties, for example stabilisers, kickers or melting point depressants. Additives for recordable recording media and their amounts used are known per se. By adding additives, for example the compounds described in EP-600 427, the form of the pits produced by the laser radiation can be controlled better, resulting in the reproduction of an improved faultless signal. Preferred additives are organometalic compounds or metal complexes of transition metals, such as metalocenes or metal acetylacetonates, metal dithiocarbamates or metal dithiophosphates, which can be used conveniently in an amount of at most 100% by weight, preferably of up to 50% by weight, most preferably of up to 20% by weight, based on the total weight of the recording layer.

The novel recording medium preferably contains one single dye of formula (I).

The recording layer of this invention particularly preferably consists essentially of one or several dyes of formula (I), optionally of one or several optional organometalic compounds or metal complexes of transition metals in an amount of up to 50% by weight, and optionally of one or several optional colourless salts in an amount of less than 20% by weight, each based on the total weight of the recording layer. The recording layer very particularly preferably consists of a dye of formula (I), of an optional organometallic compound or of a metal complex of a transition metal in an amount of up to 20% by weight and of an optional colourless salt in an amount of up to 1% by weight.

Ligands $L_2$ or $L_2'$ are preferably of formula (IV) or (V). Particularly preferably, at least two ligands $L_1$, $L_1'$, $L_2$ or $L_2'$ conform to formula (II), (III), (IV) or (V).

$M_1$ and $M_2$ are preferably Co.

$A_1$ and $A_2$ are preferably each independently of the other $C(CH_3)_2$, O, S or CH=CH. $A_1$ and $A_2$ are particularly preferably $C(CH_3)_2$ or S, most preferably S.

p and q preferably equal 0.

Q is preferably $CR_{15}$—$CR_{16}$=$CR_{17}$ or $CR_{15}$—$CR_{16}$=$CR_{17}$—$CR_{18}$=$CR_{19}$.

Q is particularly preferably $CR_{15}$—$CR_{16}$=$CR_{17}$.

$R_1$ and $R_2$ are preferably each independently of the other $C_1$–$C_{12}$alkyl which is unsubstituted or mono- or polysubstituted by halogen, hydroxy or $C_1$–$C_{12}$alkoxy, or $C_7$–$C_{12}$aralkyl which is unsubstituted or substituted by $R_{20}$, or by $R_{20}$ and $R_{21}$.

$R_3$, $R_4$, $R_5$ and $R_6$ are preferably each independently of one another hydrogen, halogen, nitro, cyano, amino, $NHR_{22}$, $NR_{22}R_{23}$, $CONH_2$, $CONHR_{22}$, $CONR_{22}R_{23}$, COOH, $COOR_{24}$, $NHCOR_{25}$, $NR_{24}COR_{25}$, or $C_1$–$C_{12}$alkyl or $C_1$–$C_{12}$alkoxy, each of which is unsubstituted or mono- or polysubstituted by halogen, hydroxy or cyano; or $R_3$ and $R_4$ and/or $R_5$ and $R_6$ together are 1,4-buta-1,3-dienylene so that naphthyl is formed with the shared phenyl.

$R_7$, $R_8$, $R_9$, $R_{10}$, $R_{11}$, $R_{12}$, $R_{13}$ and $R_{14}$ are preferably each independently of one another hydrogen, halogen, nitro, cyano, amino, $NHR_{22}$, $NR_{22}R_{23}$, $CONH_2$, $CONHR_{22}$, $CONR_{22}R_{23}$, $SO_2C_1$–$C_{12}$alkyl, $SO_2NH_2$, $SO_2NHR_{22}$, COOH, $COOR_{24}$, $NHCOR_{25}$, $NR_{24}COR_{25}$, or $C_1$–$C_{12}$alkyl or $C_1$–$C_{12}$alkoxy, each of which is unsubstituted or mono- or polysubstituted by halogen.

$R_{15}$, $R_{16}$, $R_{17}$, $R_{18}$ and $R_{19}$ are preferably each independently of one another hydrogen, halogen, $C_1$–$C_4$alkyl or phenyl.

$R_{20}$ and $R_{21}$ are preferably each independently of the other hydrogen, halogen, nitro, cyano, amino, $NHR_{22}$, $NR_{22}R_{23}$, $NHCOR_{25}$, $NR_{24}COR_{25}$, $C_1$–$C_{12}$alkyl or $C_1C_{12}$alkoxy.

$R_{22}$ and $R_{23}$ are each independently of the other $C_1$–$C_{12}$alkyl, $C_2$–$C_{12}$alkenyl, $C_6$–$C_{12}$aryl or $C_7$–$C_{12}$aralkyl, each of which is unsubstituted or mono- or polysubstituted by $C_1$–$C_8$alkoxy; or $R_{22}$ and $R_{23}$, together with the linking nitrogen atom, are pyrrolidine, piperidine, piperazine or morpholine.

$R_{24}$ and $R_{25}$ are each independently of the other $C_1$–$C_{12}$alkyl, $C_2$–$C_{12}$alkenyl, $C_6$–$C_{12}$aryl or $C_7$–$C_{12}$aralkyl.

Particularly preferably, at least one ligand dianion $L_1$, $L_1'$, $L_2$ or $L_2'$ is of formula

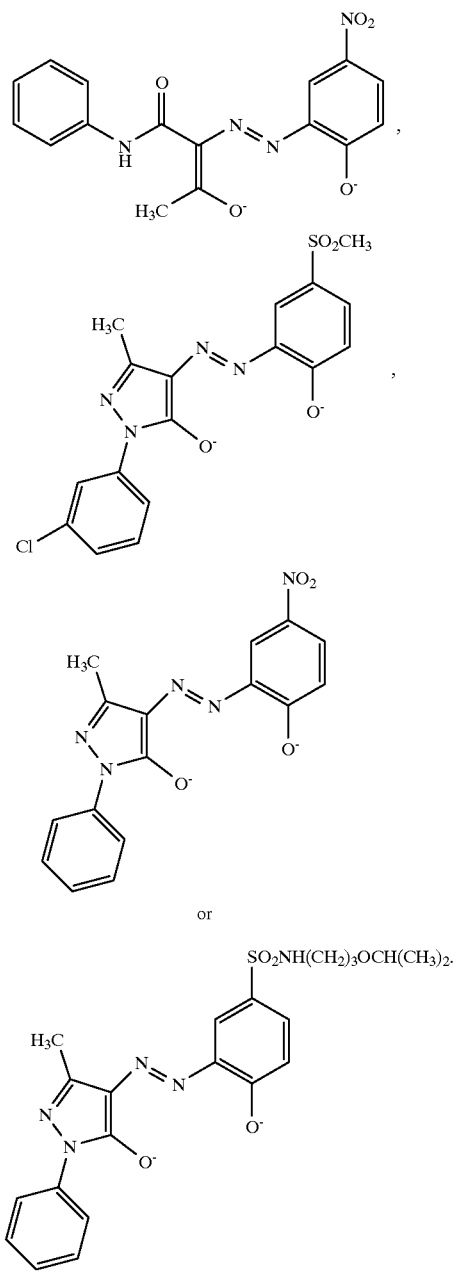

Very particularly preferably, all ligand dianions $L_1$, $L_1'$, $L_2$ and $L_2'$ have a structure selected from the group consisting of these four structures.

The dyes of formula (I) themselves are novel and are therefore also an object of this invention. Preferred dyes are the same as those which are preferred as components of an optical recording layer.

The dyes of formula (I) can be prepared from known substances by processes known per se in analogy to known dyes. Suitable preparation methods are, for example, the methods described in the above state of the art, such as crystallisation from salt mixtures where the desired dye precipitates and the respective unwanted counterions remain in solution, or where the desired dye remains in solution and the unwanterd counterions precipitate, or also removal of the unwanted counterions on a cationic or anionic ion exchanger. In the case of the dyes of formula (I), where m=1, uniform azo metal complex ligands are conveniently used, and in the case of the dyes of formula (I), where m<1, mixtures of azo metal complex ligands are used instead.

The novel dyes of formula (I) usually have a long-wave absorption which corresponds to the cyanine cation chromophore as well as a weaker short-wave absorption which corresponds to the chromophore of the azo metal complex ligand.

The use of dyes of formula (I) results in advantageous homogeneous, amorphous and low-scatter recording layers and, surprisingly, the long-wave absorption is particularly steep also in the solid phase while also having a high absorption coefficient and a high refractive index. Other advantages are the high daylight stability and stability at low laser radiation (when reading) coupled with high sensitivity to high-energy laser radiation (when recording), the uniform pits as well as the good heat and storage stability.

Depending on the numbers m and n, the dyes of formula (I) can have only a single anion $[L_1=M_1=L_1']^-$ or two anions $[L_1=M_1=L_1']^-$ and $[L_2=M_2=L_2']^-$. Although in principal it is not necessary to use a second anion $[L_2=M_2=L_2']^-$, it has very surprisingly been found that azo metal complex anions of formula (II), (III), (IV), (V) or (VI) have different effects on the long-wave absorption of the dyes of formula (I) in the solid state so that it is possible to selectively shift the long-wave absorption of the dyes of formula (I) in the solid phase in a range of up to about 10 nm by partially replacing anions containing ligands of formula (II) or (III) with anions containing ligands of formula (IV), m or (VI).

This results in the substantial additional advantage that the novel dyes of formula (I) can be optimally adjusted regarding their optical properties by replacing the uniform azo metal complex anions with mixtures thereof. For instance, by partially replacing an azo metal complex anion, the cyanine salt of which has a specific absorption maximum, with another azo metal complex anion, the cyanine salt of which has a different absorption maximum, it is possible to optimize the exact position of the long-wave absorption edge of a dye of formula (I) in the solid state without any change of the cyanine chromophore and without any levelling of the long-wave absorption edge; or it is possible to increase the light stability of a dye of formula (I) by partially replacing an azo metal complex anion, the cyanine salt of which is rather poorly light-stable, with another azo metal complex anion, the cyanine salt of which has a better stability to light.

Accordingly, metal complex anions $[L_1=M_1=L_1']^-$ are conveniently combined with metal complex anions $[L_2=M_2']^-$ which are structurally so different that the absorption maxima of their cyanine salts differ by at least 5 nm in the solid state. The difference of the absorption maxima of the two cyanine salts in the solid state is preferably at least 10 nm. If metal complex anions $[L_1=M_1=L_1']^-$ and $[L_2=M_2=L_2']^-$ are combined, the number n is preferably in the range from 0.1 to 0.7, particularly preferably from 0.2 to 0.5.

Structurally different metal complex anions $[L_1=M_1=L_1']^-$ and $[L_2=M_2=L_2']^-$ in this case are preferably those, wherein $M_1$ and $M_2$ are different metals;

$L_2$ and $L_2'$ are of formula (V) and/or (VI), if $L_1$ and $L_1'$ are of formula (II);

$L_2$ and $L_2'$ are of formula (IV) and/or (VI), if $L_1$ and $L_1'$ are of formula (III);

$L_2$ is of formula (V) or (VI) is $L_1$ is of formula (II), $L_1'$ is of formula (III) and $L_2'$ is of formula (V);

the respective numbers p and q in $L_1$ and $L_2$ and/or in $L_1'$ and $L_2'$ are different; or $R_7$ and $R_8$ in $L_1$ or $L_1{'}$ by their identity and position have markedly different effects on the π-electron density at the atom $C_A$ attached to the azo group in formula (X) than $R_{11}$ and $R_{12}$ in $L_2$ or $L_2{'}$ have on the π-electron density at the $C_B$ atom attached to the azo group in formula (XI)

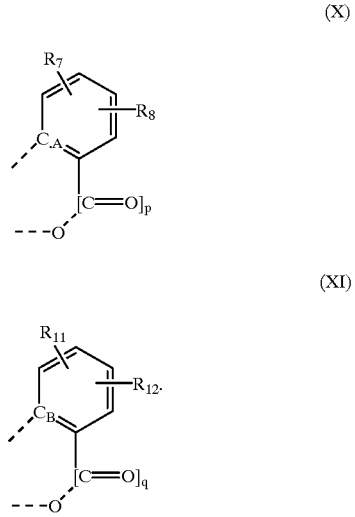

Suitable substrates are, for example, glasses, minerals, ceramics and thermosets or thermoplastics. Preferred substrates are glasses and homo- or copolymeric plastic materials. Suitable plastic materials are, for example, thermoplastic polycarbonates, polyamides, polyesters, polyacrylates and polymethacrylates, polyurethanes, polyolefins, polyvinyl chloride, polyvinylidene fluoride, polyimides, duroplastic polyesters and epoxy resins. The substrate can be in pure form or can also contain customary additives, such as UV absorbers or dyes, as is proposed, inter alia, in JP 04/167 239 as light stabiliser for recording layers. In the latter case it may be convenient for the dye added to the substrate to have an absorption maximum which is hypsochromically shifted relative to the dye of the recording layer by at least 10 nm, preferably by at least 20 nm.

Conveniently, the substrate is transparent in at least one part of the range from 600 to 700 nm so that it can be penetrated by at least 90% of the incident light of the recording or readout wavelength. On the side of the coating the substrate preferably has a spiral guide groove with a groove depth from 50 to 500 nm, a groove width from 0.1 to 0.8 μm and a spacing between 2 turns from 0.4 to 1.6 μm, particularly preferably with a groove depth of 80 to 250 μm, more preferably of 80 to 200 μm, a groove width of 0.2 to 0.5 μm, particularly preferably of 0.2 to 0.4 μm and a spacing between 2 turns from 0.6 to 0.8 μm, preferably from 0.7 to 0.8 μm. Grooves having different cross-sectional profiles are known, for example rectangular-, trapeze- or V-shaped grooves.

A particularly suitable reflecting material for the reflection layer comprises metals which are good reflectors of the laser radiation used for recording and reproduction, examples being the metals of the third, fourth and fifth main groups and subgroups of the Periodic Table of the chemical elements. Particularly suitable metals are Al, In, Sn, Pb, Sb, Bi, Cu, Ag, Au, Zn, Cd, Hg, Sc, Y, La, Ti, Zr, Hf, V, Nb, Ta, Cr, Mo, W, Fe, Co, Ni, Ru, Rh, Pd, Os, Ir, Pt and the lanthanide metals Ce, Pr, Nd, Pm, Sm, Eu, Gd, Tb, Dy, Ho, Er, Tm, Yb and Lu, and also alloys thereof. For reasons of high reflectivity and ease of preparation, particular preference is given to a reflection layer of aluminium, silver, copper, gold or their alloys.

That layer which, depending on the layer structure, is topmost, e.g. the reflection layer or recording layer, is conveniently provided with an additional protective layer which can have a thickness of 0.1 to 1000 μm, preferably of 0.1 to 50 μm and, particularly preferably, of 0.5 to 15 μm. This protective layer can, if desired, also serve as adhesive for a second substrate layer applied thereon which is preferably 0.1 to 5 mm thick and consists of the same material as the support substrate. If two substrates coated with a recording and a reflecting layer, in that order, are joined by a adhesion layer, a recording medium is obtained which can be recorded on both sides.

Suitable materials for the protective layers are mainly plastic materials, a thin layer of which is applied to the substrate or to the topmost layer either direct or by means of adhesion layers. It is judicious to choose mechanically and thermally stable plastic materials having good surface properties which can additionally be modified, for example recorded. These plastics can be thermosets or thermoplastics. Preference is given to radiation-cured (for example using UV radiation) protective layers which are particularly easy and economical to prepare. Many radiation-curable materials are known. Examples of radiation-curable monomers and oligomers are acrylates and methacrylates of diols, triols and tetrols, polyimides consisting of aromatic tetracarboxylic acids and aromatic diamines containing $C_1$–$C_4$alkyl groups in at least two positions ortho to the amino groups, and oligomers containing dialkyl groups, for example dimethylmaleinimidyl groups.

The novel recording media can also feature additional layers, for example interference layers.

It is also possible to construct recording media having several (for example two) recording layers. The construction and use of such materials are known to the skilled person. If such layers are present, preference is given to interference layers which are disposed between the recording layer and the reflecting layer and/or between the recording layer and the substrate and which consist of a dielectric material, for example $TiO_2$, $Si_3N_4$, ZnS or silicone resins as described in EP 353 393.

The novel recording media can be prepared by processes known per se, and different coating methods can be used depending on the materials used and their operation.

Examples of suitable coating methods are dipping, flow coating, spreading, knife coating and spin coating, and also high-vacuum vapour deposition methods. When using flow coating methods, for example, solutions in organic solvents are generally used. When using solvents, care should be taken to ensure that the substrates used are insensitive to these solvents. Suitable coating methods and solvents are described, inter alia, in EP 401 791.

The recording layer is preferably applied by spin coating a dye solution, solvents that have been found appropriate being, in particular, alcohols, such as 2-methoxyethanol, isopropanol or n-butanol, hydroxy ketones, such as diacetone alcohol or 3-hydroxy-3-methyl-2-butanone, hydroxy ester, for example methyl lactate or methyl isobutyrate or, preferably, fluorinated alcohols, typically 2,2,2-trifluoroethanol or 2,2,3,3-tetrafluoro-1-propanol, and mixtures thereof. Other suitable solvents are disclosed, inter alia, in EP-483387.

The metallic reflection layer is preferably applied by sputtering, vapour deposition under vacuum or chemical vapour deposition (CVD). The sputtering technique is particularly preferred on account of the high degree of adhesion to the support for the application of the metallic reflection layer. These techniques are known and are described in the literature (e.g. in J. L. Vossen and W. Kern, "Thin Film processes", Academic Press, 1978).

The construction of the novel recording medium depends principally on the readout method; known functional principles are the recording of the change in transmission or, preferably, in reflection.

If the recording material is constructed in accordance with the change in reflection, then the following structures are examples of those which can be employed: transparent support/recording layer (one or more layers)/reflection layer and, if useful, protective layer (not necessarily transparent), or support (not necessarily transparent)/reflection layer/recording layer and, if useful, transparent protective layer. In the former case the light is irradiated from the support side, while in the latter case the radiation is incident from the side of the recording layer or, if appropriate, from the side of the protective layer. In both cases the light detector is on the same side as the light source. The former construction of the recording material to be used in accordance with the invention is generally preferred.

If the recording material is constructed in accordance with the change in light transmission, the following alternative structure is a suitable example: transparent support/recording layer (one or more layers) and, if useful, transparent protective layer. The light for recording and for readout can be irradiated alternatively from the support side or from the side of the recording layer or, if appropriate, from the side of the protective layer, the light detector in this case always being on the opposite side.

Examples of suitable lasers for recording and/or for reading out the pits are commecial diode lasers, for example GaAsAl, InGaAlP or GaAs laser diodes with a wavelength of 635, 650, 670, 680, 780 or 830 nm, the radiation of which is focussed on the recording layer. Recording is carried out by known processes by recording pits of fixed or variable length using a modulated and focussed laser beam which is guided at constant or variable speed on the surface of the recording layer.

The readout of the information is carried out by methods known per se by recording the change in absorption or reflection using laser radiation as described, inter alia, in "CD-Player and R-DAT Recorder" (Claus Biaesch-Wiepke, Vogel Buchverlag, Würzburg 1992). The skilled person is familiar with the requirements.

The novel information-containing medium is, in particular, an optical information material of the WORM type. It can be used, for example, as playable CD (compact disc), as CD-R (compact disc-recordable) or DVD-R (digital video disc-recordable) recording material for computers or as identity and security card, or for the production of diffractive optical elements such as holograms.

Accordingly, this invention also relates to the use of the novel recording medium for optically recording, storing or reproducing information. Recording is preferably carried out at the wave-length range from 300 to 800 nm, particularly preferably from 500 to 800 nm, very particularly preferably from 600 to 800 nm. Reproduction is preferably carried out in the wave-length range from 600 to 800 nm. Recording and reproduction are very particularly preferably carried out at the same wavelegth range from 600 to 800 nm.

Using the novel process it is possible to record information with a high degree of reliability and durability and being distinguished by excellent mechanical and thermal stability as well as by high light stability and sharp edge zones of the pits. A special advantage is the surprisingly high signal/noise ratio and the low jitter which permit faultless readout. The high storage capacity as particularly valuable in the video sector.

The following Examples illustrate the invention in more detail (the stereochemistry of the cyanine double bonds is unknown so that in the case of Z-drawn double bonds, their E-form needs to be considered as alternative and in the case of the trans-drawn double bonds also their cis-form—possibly they may also be mixtures of different isomers):

EXAMPLE A1

0.30 g of the product of formula CY-1 (Nippon Kankoh Shikiso Kenkyusho) and 0.39 g of the product of formula AZ-1 (Ciba Specialty Chemicals Inc.)

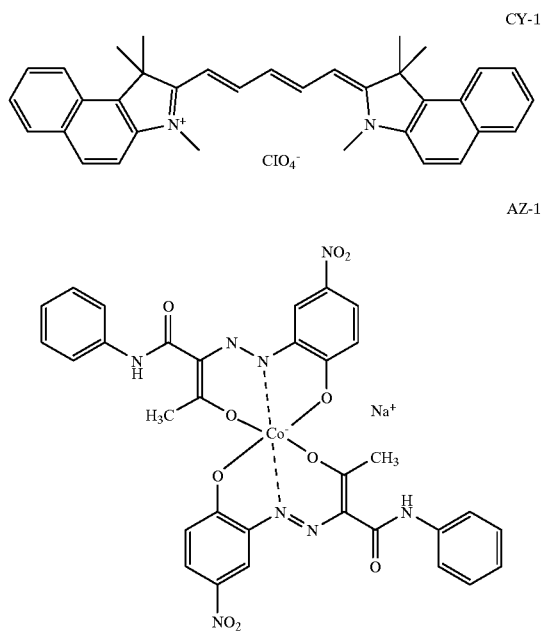

are dissolved in 20 ml of methylene chloride. This solution is completely concentrated by evaporation in a rotary evaporator at 50° C. The residue is suspended in 300 ml of water and stirred for 30 minutes with a mixer. After filtration, the residue is suspended again in 300 ml of water and stirred for 30 minutes with a mixer. After filtration, the product is washed with water and dried overnight at 50° C./160 mbar, giving 0.60 g (95% of theory) of a green powder which, according to elemental analysis, contains 0.14% of sodium.

UV/VIS (ethanol): $\lambda_{max}$=679 nm, $\epsilon$=201'810 l·mol$^{-1}$ cm$^{-1}$.

EXAMPLES A2–A24

The general procedure of Example A1 is repeated, but replacing cyanine CY-1 with the cyanines CY-2 to CY-24:

| Example | Cyanine | Amount [g] | Azo complex | Amount [g] | Yield [g] | $\lambda_{max}$ (ethanol) [nm] | $\epsilon$ (ethanol) [$l \cdot mol^{-1} \cdot cm^{-1}$] |
|---|---|---|---|---|---|---|---|
| A2 | CY-2 | 0.17 | AZ-1 | 0.26 | 0.28 | 548 | 104,280 |
| A3 | CY-3 | 0.51 | AZ-1 | 0.79 | 1.10 | 559 | 141,190 |
| A4 | CY-4 | 0.50 | AZ-1 | 0.67 | 0.84 | 564 | 153,170 |
| A5 | CY-5 | 1.50 | AZ-1 | 2.07 | 3.10 | 573 | 148,660 |
| A6 | CY-6 | 0.50 | AZ-1 | 0.69 | 1.00 | 578 | 126,640 |
| A7 | CY-7 | 0.25 | AZ-1 | 0.31 | 0.50 | 579 | 72,144 |
| A8 | CY-8 | 0.50 | AZ-1 | 0.60 | 0.90 | 580 | 98,280 |
| A9 | CY-9 | 0.50 | AZ-1 | 0.68 | 0.89 | 587 | 111,870 |
| A10 | CY-10 | 0.50 | AZ-1 | 0.64 | 0.94 | 596 | 123,010 |
| A11 | CY-11 | 0.20 | AZ-1 | 0.23 | 0.39 | 685 | 180,080 |
| A12 | CY-12 | 0.50 | AZ-1 | 0.68 | 0.95 | 565 | 119,390 |
| A13 | CY-13 | 0.50 | AZ-1 | 0.78 | 1.00 | 582 | 196,100 |
| A14 | CY-14 | 0.50 | AZ-1 | 0.65 | 0.99 | 573 | 138,120 |
| A15 | CY-15 | 0.20 | AZ-1 | 0.26 | 0.33 | 569 | 108,100 |
| A16 | CY-16 | 0.20 | AZ-1 | 0.24 | 0.40 | 579 | 90,550 |
| A17 | CY-17 | 0.16 | AZ-1 | 0.21 | 0.34 | 580 | 87,630 |
| A18 | CY-18 | 0.20 | AZ-1 | 0.22 | 0.18 | 563 | 99,640 |
| A19 | CY-19 | 2.00 | AZ-1 | 2.94 | 3.20 | 560 | 106,590 |
| A20 | CY-20 | 2.00 | AZ-1 | 2.86 | 3.94 | 565 | 122,860 |
| A21 | CY-21 | 2.00 | AZ-1 | 2.62 | 2.94 | 577 | 137,690 |
| A22 | CY-22 | 2.00 | AZ-1 | 2.20 | 3.60 | 679 | 222,770 |
| A23 | CY-23 | 0.20 | AZ-1 | 0.28 | 0.33 | 577 | 78,210 |
| A24 | CY-24 | 2.50 | AZ-1 | 3.23 | 5.00 | 577 | 154,910 |
CY-2:
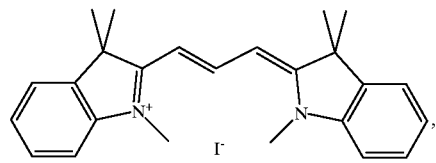
CY-3:
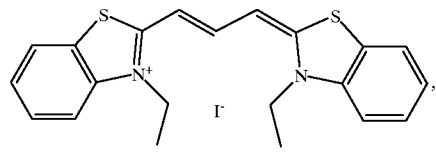
CY-4:
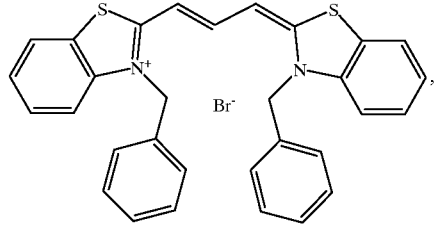
CY-5:
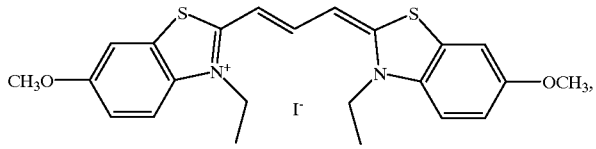
CY-6:
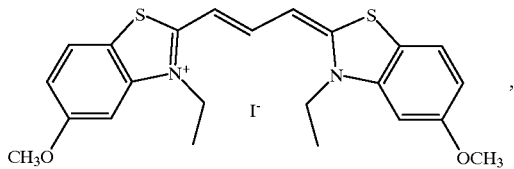

-continued
CY-7:
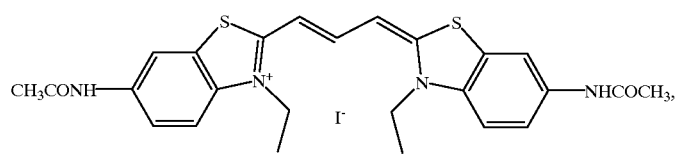
CY-8:
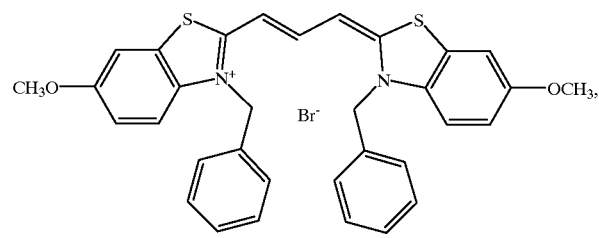
CY-9:
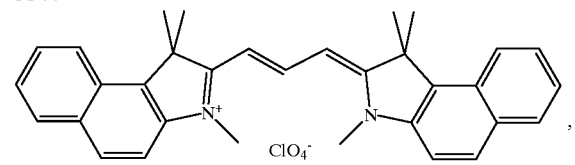
CY-10:
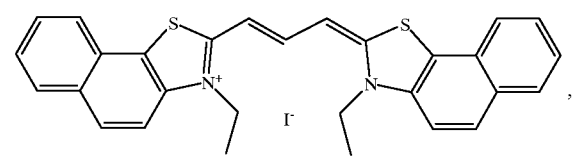
CY-11:
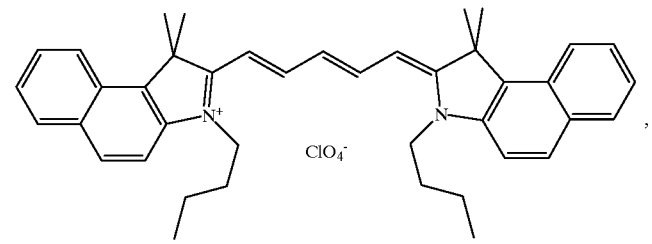
CY-12:
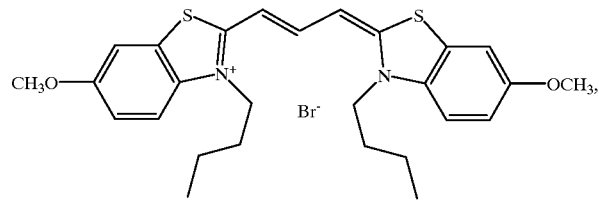
CY-13:
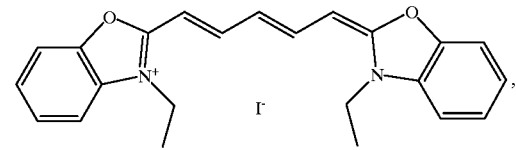

-continued
CY-14:
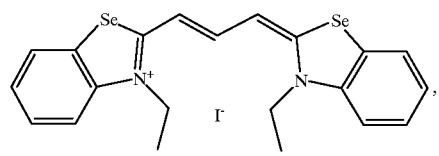
CY-15:
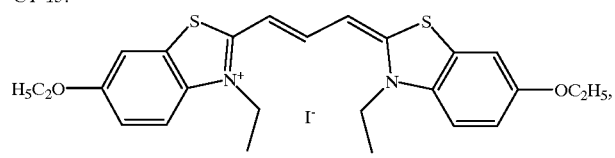
CY-16:
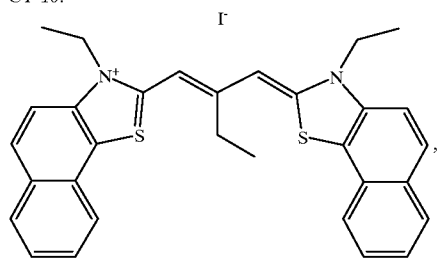
CY-17:
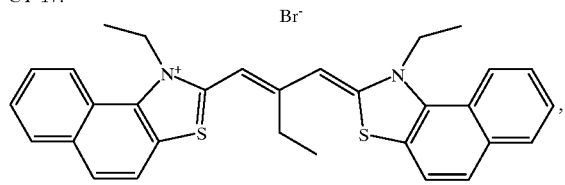
CY-18:
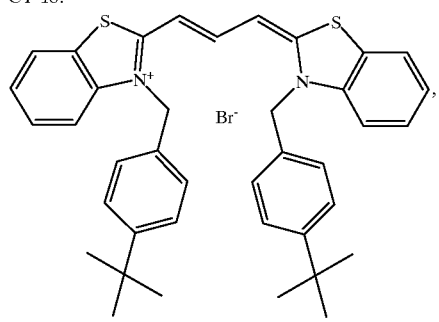
CY-19:
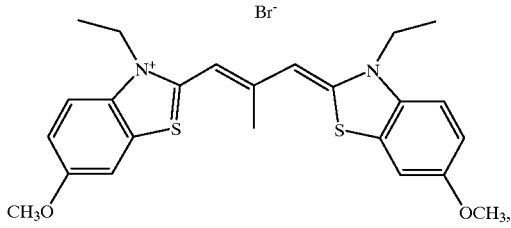
CY-20:
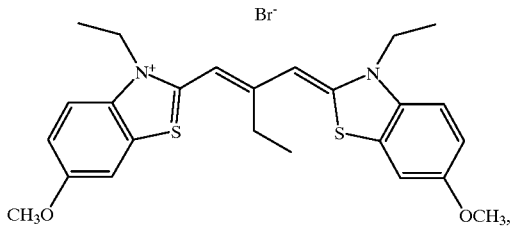

CY-21:
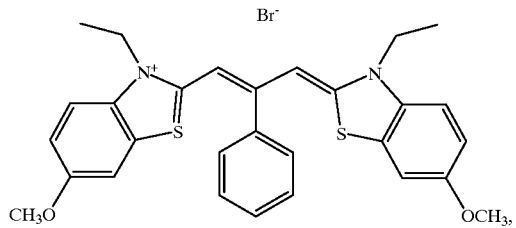

CY-22:
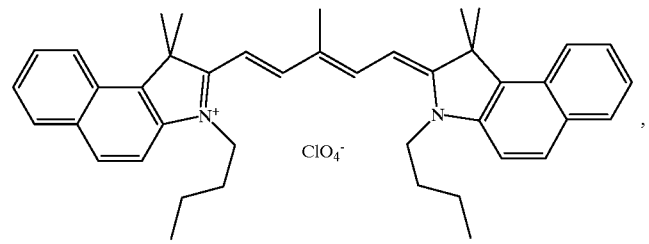

CY-23:
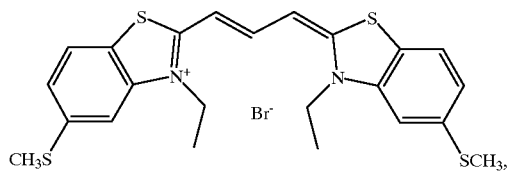

CY-24:
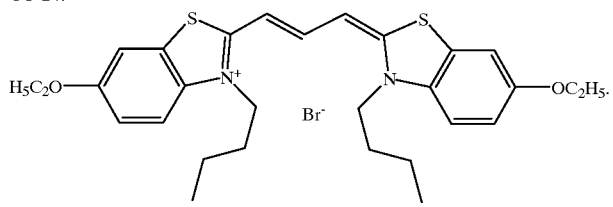

CY-3 (Aldrich), CY-9, CY-10, CY-11, CY-13, CY-14, CY-16, CY-17 (NK-3229, NK-467, NK-3219, NK-1533, NK-616, NK-1056, NK-716, all of Nippon Kankoh-Shikiso Kenkyusho Co., Ltd) and CY-22 (OM-65, Fuji Photo Film Co, Ltd) are commercially available. CY-19, CY-20 and CY-21 are prepared in accordance with the method disclosed in Makromol. Chem. 182, 3427 (1981). Other cyanines can be prepared in accordance with known methods.

EXAMPLES A25–A54

The general procedure of Example A1 is repeated, but replacing cyanine CY-1 and/or the azo metal complex AZ-1 with the following compounds:

| Example | Cyanine | Amount [g] | Azo complex | Amount [g] | Yield [g] | $\lambda_{max}$ (ethanol) [nm] | $\epsilon$ (ethanol) [$l \cdot mol^{-1} \cdot cm^{-1}$] |
|---|---|---|---|---|---|---|---|
| A25 | CY-1 | 0.30 | AZ-2 | 0.51 | 0.70 | 679 | 177,060 |
| A26 | CY-4 | 0.50 | AZ-2 | 0.87 | 1.06 | 564 | 142,460 |
| A27 | CY-4 | 0.50 | AZ-3 | 0.94 | 1.18 | 564 | 141,890 |
| A28 | CY-4 | 0.50 | AZ-4 | 0.78 | 1.03 | 564 | 123,760 |
| A29 | CY-4 | 0.50 | AZ-5 | 0.79 | 0.99 | 564 | 102,050 |
| A30 | CY-4 | 0.50 | AZ-7 | 0.82 | 1.10 | 564 | 126,420 |
| A31 | CY-5 | 0.50 | AZ-2 | 0.90 | 1.25 | 573 | 128,950 |
| A32 | CY-5 | 0.50 | AZ-3 | 0.96 | 1.17 | 572 | 118,860 |
| A33 | CY-5 | 0.50 | AZ-7 | 0.82 | 1.03 | 570 | 95,870 |
| A34 | CY-6 | 0.50 | AZ-2 | 0.93 | 1.20 | 569 | 105,570 |
| A35 | CY-6 | 0.50 | AZ-3 | 0.96 | 1.20 | 571 | 99,610 |
| A36 | CY-6 | 0.50 | AZ-7 | 0.84 | 1.00 | 573 | 97,780 |
| A37 | CY-11 | 50 | AZ-2 | 76.8 | 126.5 | 684 | 192,340 |
| A38 | CY-11 | 50 | AZ-3 | 79.8 | 127.5 | 684 | 181,450 |
| A39 | CY-11 | 50 | AZ-7 | 69.7 | 114.0 | 684 | 185,620 |
| A40 | CY-12 | 2.50 | AZ-2 | 4.56 | 6.50 | 576 | 136,620 |
| A41 | CY-12 | 2.50 | AZ-3 | 4.70 | 6.10 | 576 | 138,940 |

-continued
| Example | Cyanine | Amount [g] | Azo complex | Amount [g] | Yield [g] | $\lambda_{max}$ (ethanol) [nm] | $\epsilon$ (ethanol) [$l \cdot mol^{-1} \cdot cm^{-1}$] |
|---|---|---|---|---|---|---|---|
| A42 | CY-12 | 3.00 | AZ-7 | 5.00 | 6.60 | 576 | 132,060 |
| A43 | CY-13 | 0.50 | AZ-2 | 1.02 | 1.34 | 582 | 179,310 |
| A44 | CY-13 | 0.50 | AZ-3 | 1.10 | 1.40 | 582 | 127,800 |
| A45 | CY-13 | 0.50 | AZ-7 | 0.97 | 1.30 | 582 | 106,720 |
| A46 | CY-15 | 0.20 | AZ-2 | 0.35 | 0.50 | 568 | 108,180 |
| A47 | CY-15 | 0.20 | AZ-3 | 0.37 | 0.50 | 569 | 106,600 |
| A48 | CY-15 | 0.20 | AZ-7 | 0.26 | 0.34 | 569 | 75,200 |
| A49 | CY-18 | 0.20 | AZ-2 | 0.30 | 0.38 | 564 | 96,360 |
| A50 | CY-18 | 0.20 | AZ-3 | 0.31 | 0.28 | 563 | 116,070 |
| A51 | CY-18 | 0.20 | AZ-7 | 0.22 | 0.15 | 564 | 65,810 |
| A52 | CY-24 | 2.00 | AZ-2 | 3.50 | 5.20 | 577 | 141,230 |
| A53 | CY-24 | 2.00 | AZ-3 | 3.60 | 5.10 | 577 | 156,540 |
| A54 | CY-24 | 2.50 | AZ-7 | 3.90 | 5.60 | 577 | 132,280 |
AZ-2:
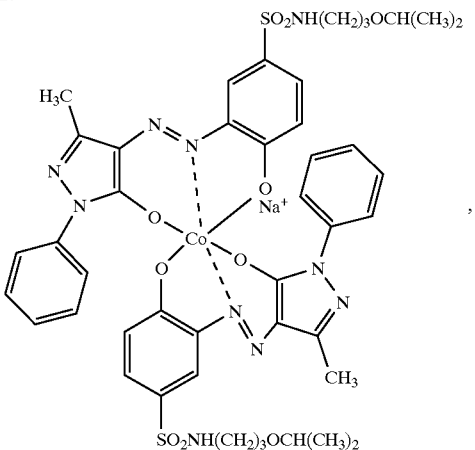
AZ-3:
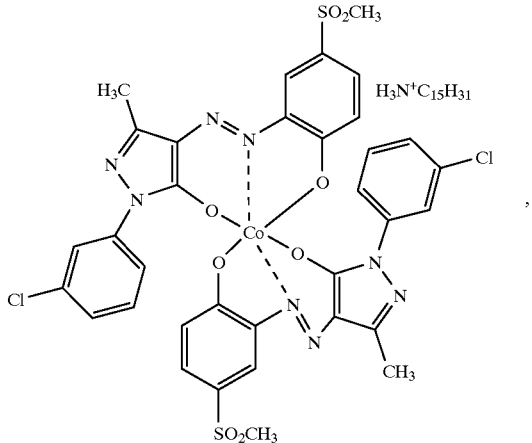

-continued
| Example | Cyanine | Amount [g] | Azo complex | Amount [g] | Yield [g] | $\lambda_{max}$ (ethanol) [nm] | $\epsilon$ (ethanol) [l · mol$^{-1}$ · cm$^{-1}$] |
|---|---|---|---|---|---|---|---|
AZ-4:
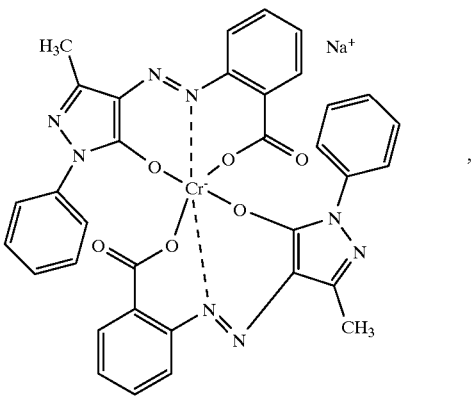
,
AZ-5:
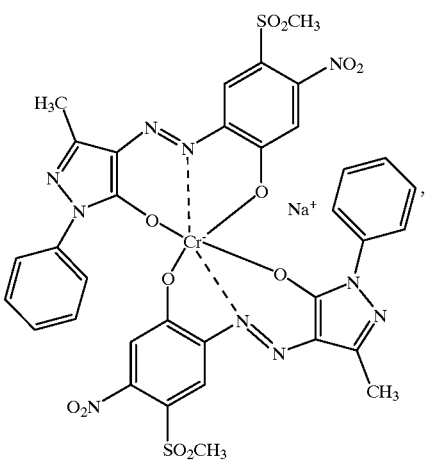
,
AZ-6:
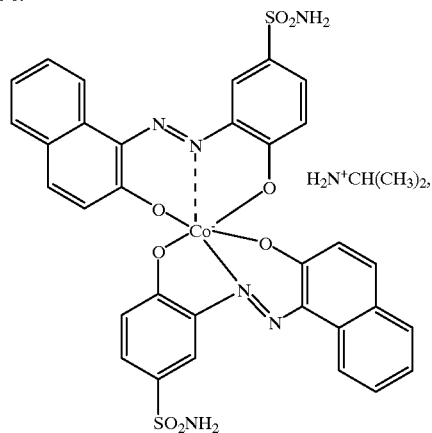

AZ-7:

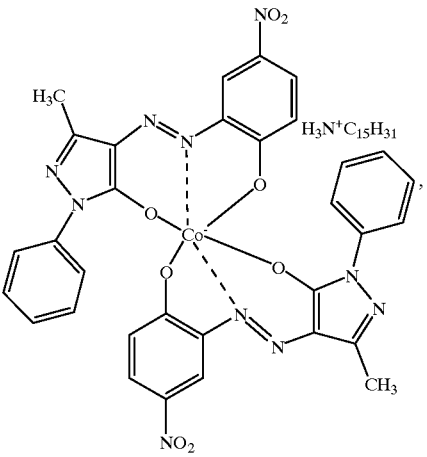

EXAMPLES A55–A64

The general procedure of Examples A1–A24 is repeated, but using in each case a mixture of two different azo metal complexes:

| Example | Cyanine | Amount [g] | Azo complex | Amount [g] | Yield [g] | $\lambda_{max}$ (ethanol) [nm] | $\epsilon$ (ethanol) [l · mol$^{-1}$ · cm$^{-1}$] |
|---|---|---|---|---|---|---|---|
| A55 | CY-4 | 0.50 | AZ-5 | 0.39 | 1.17 | 563 | 141,440 |
|  |  |  | AZ-6 | 0.35 |  |  |  |
| A56 | CY-4 | 0.50 | AZ-6 | 0.35 | 1.08 | 564 | 156,190 |
|  |  |  | AZ-1 | 0.34 |  |  |  |
| A57 | CY-4 | 0.50 | AZ-2 | 0.43 | 1.20 | 564 | 151,860 |
|  |  |  | AZ-5 | 0.39 |  |  |  |
| A58 | CY-4 | 0.50 | AZ-1 | 0.34 | 1.10 | 564 | 138,450 |
|  |  |  | AZ-3 | 0.47 |  |  |  |
| A59 | CY-4 | 0.50 | AZ-6 | 0.35 | 1.12 | 564 | 129,990 |
|  |  |  | AZ-3 | 0.47 |  |  |  |
| A60 | CY-4 | 0.50 | AZ-3 | 0.47 | 1.18 | 564 | 127,530 |
|  |  |  | AZ-2 | 0.43 |  |  |  |
| A61 | CY-4 | 0.50 | AZ-4 | 0.40 | 1.10 | 564 | 122,630 |
|  |  |  | AZ-3 | 0.47 |  |  |  |
| A62 | CY-4 | 0.50 | AZ-1 | 0.34 | 1.20 | 564 | 150,530 |
|  |  |  | AZ-2 | 0.43 |  |  |  |
| A63 | CY-1 | 0.20 | AZ-5 | 0.16 | 0.48 | 679 | 208,840 |
|  |  |  | AZ-6 | 0.14 |  |  |  |
| A64 | CY-1 | 0.30 | AZ-1 | 0.20 | 0.65 | 679 | 195,760 |
|  |  |  | AZ-2 | 0.25 |  |  |  |

EXAMPLE A65

2 g of CY-11 and 2.28 g of AZ-1 are dissolved in 60 ml of methylisobutyl ketone and washed with 3×60 ml of water. The organic phase is then charged with 500 ml of water and the solvent is distilled off by steam distillation. The dark green solid is then collected by filtration, washed with 3×50 ml of water and dried overnight at 60° C./160 mbar. 3.30 g (84.4% of theory) of a blueish-green powder are obtained which contains 0.34% of chlorine (the amount of sodium is below the detection limit of 10 ppm).

UV/VIS (ethanol): $\lambda_{max}$=684 nm, $\epsilon$=202'270 l·mol$^{-1}$ cm$^{-1}$.

EXAMPLE A66

2.0 g of CY-5 and 3.01 g of AZ-1 are dissolved at reflux in 75 ml of n-propanol.

With stirring, 600 ml of water are added dropwise. The resulting suspension is cooled to room temperature and filtered, and the residue is dried overnight at 50° C./160 mbar, giving 4.58 g (99.5% of theory) of a reddish brown powder which contains 286 ppm of sodium and 0.69% of bromine.

UV/VIS (N-methylpyrrolidone): $\lambda_{max}$=579 nm, $\epsilon$=135'180 l·mol$^{-1}$ cm$^{-1}$.

EXAMPLE A67

2.0 g of CY-5 and 3.01 g of AZ-1 are dissolved at 80° C. in 40 ml of N-methyl-pyrrolidone. With stirring, 150 ml of water are then added dropwise. The resulting suspension is cooled to room temperature and filtered, and the residue is washed with 3×100 ml of water and dried overnight at 50°

C./160 mbar, giving 3.97 g (86.2% of theory) of a reddish brown powder which contains 31 ppm of sodium (the amount of bromine is below the detection limit of 0.3%).

UV/VIS (N-methylpyrrolidone): $\lambda_{max}$=579 nm, $\epsilon$=137'050 l·mol$^{-1}$ cm$^{-1}$.

EXAMPLE A68

2.0 g of CY-5 and 3.01 g of AZ-1 are dissolved at 80° C. in 40 ml of N,N-dimethylacetamide. With stirring, 150 ml of water are then added dropwise. The resulting suspension is cooled to room temperature and filtered, and the residue is washed with 3×100 ml of water and dried overnight at 50° C./160 mbar, giving 3.77 g (81.9% of theory) of a reddish brown powder which contains 19 ppm of sodium (the amount of bromine is-below the detection limit of 0.3%).

UV/VIS (N-methylpyrrolidone): $\lambda_{max}$=579 nm, $\epsilon$=136'960 l·mol$^{-1}$ cm$^{-1}$.

EXAMPLE A69

2.0 g of CY-5 and 3.01 g of AZ-1, 130 ml of 1-pentanol and 100 ml of water are placed in a vessel and the mixture is heated, with stirring, to 80° C. After separating the phases, the organic phase is charged with another 2×100 ml of water, mixed with stirring and the phases are then separated again. 200 ml of water are then added to the organic phase and the solvent is distilled off azeoptropically under normal pressure. The resulting suspension is cooled to room temperature and filtered, and the residue is washed with 3×100 ml of water and dried overnight at 50° C./160 mbar, giving 1.81 g (39.3% of theory) of a reddish brown powder which does not contain any detectable amounts of sodium or bromine.

UV/VIS (N-methylpyrrolidone): $\lambda_{max}$=579 nm, $\epsilon$=134'900 l·mol$^{-1}$ cm$^{-1}$.

EXAMPLE A70

The compound of Example A5 is analysed by TGA (heating rate 10° C./min., 35–400° C.). Degradation starts at 250° C.

EXAMPLE A71

0.25 g of the compound of Example A5 and 0.05 g of benzoylferrocene are dissolved in 25 ml of methylene chloride. This solution is completely concentrated by evaporation in a Rotavap and the mixture is analysed by TGA (heating rate 10° C./min., 35–400° C.). Degradation starts at 190° C.

EXAMPLE A72

0.25 g of the compound of Example A5 and 0.05 g of iron(III)acetylacetonate are dissolved in 25 ml of methylene chloride. This solution is completely concentrated by evaporation in a Rotavap and the mixture is analysed by TGA (heating rate 10° C./min., 35–40° C.). Degradation starts at 180° C.

EXAMPLE B1

2.0% by weight of the product of Example A5 are dissolved in 2,2,3,3-tetra-fluoro-1-propanol. This solution filtered through a Teflon filter having a pore width of 0.2 μm and is then spin coated at 200 rpm to the surface of a 1.2 mm thick grooved polycarbonate disc (groove depth 180 nm, groove width: 0.45 μm) having a diameter of 120 mm, excess solution being spun off. After the solvent is removed by evaporation, the dye remains as a uniform amorphous solid layer having an optical density of 1.3 at the absorption maximum of 597 nm. In a vacuum coating apparatus, a 80 nm thick aluminium layer is then applied to the recording layer. On this layer, a 13 μm thick protective layer consisting of a UV-curable photopolymer (SD-17, Dainippon Ink) is then applied by spin coating. The recording substrate has a base reflectivity of 60% at 650 nm. At a power of 4 mW and at a speed of 0.5 m/s, the active layer is recorded using a HeNe laser having a wavelength of 633 nm. On recorded sites, this procedure results in a change of reflection from 60% to 10%.

EXAMPLE B2

A solid layer of the product according to Example A4 is applied to a glass substrate and os measured spectralellipsometrically (Sopra Instrument). At a recording wavelength of 635 nm, a refractive index of n=2.3 and an absorption coefficient k=0.03 are determined.

EXAMPLE B3

On a disc tester ™DDU-1000 (Pulstec Industrial Co.), pits of different pulse lengths are recorded on a recording substrate produced according to Example B1 using a red laser diode of 635 nm at a power of 9 mW and at a linear speed of 3.84 m/s. This results in a modulation ratio of 0.17 for the shortest pit (|3/|14) and of 0.78 for the longest pit (|11/|14H). The jitter value fulfills the specification (<9%) of the DVD-R Color Books 1.0 and the recording material has a signal/noise ratio (CNR) of 66 dB.

EXAMPLE B4

1.5% by weight of the product of Example A6 are dissolved in 2,2,3,3-tetrafluoro-1-propanol. The solution is filtered according to Example B1 and is applied to a 0.6 mm thick grooved polycarbonate disc (diameter 120 mm, groove spacing: 0.8 μm, groove depth: 110 nm, groove width: 0.4 μm), excess solution being spun off by the spin coating process at 800 rpm. On a sputter apparatus (™Twister, Balzers AG), a 55 nm thick aluminium layer is applied at a power of 3 kW (3.0·10$^{-3}$ mbar argon). Subsequently, a 5 μm thick UV-curable protective varnish layer (SD-220, Dainippon Ink) is applied. On a disc tester DDU-1000, different pits are recorded at a power of 11 mW (linear speed 3.84 m/sec). The modulation ratio is 0.21 for the shortest pit (|3/|14) and 0.75 for the longest pit (|11/|14H). The jitter value is within the specification (<9%) and the signal/noise ratio (CNR) is 63 dB.

EXAMPLE B5

2.0% by weight of the product according to Example A1 are dissolved in 2,2,3,3-tetrafluoro-1-propanol and filtered (Teflon filter, 0.45 μm pore width). This solution is spin coated at 200 rpm to the surface of a 1.2 mm thick grooved (groove depth 220 nm, groove width 0.6 μm, groove spacing 1.6 μm) polycarbonate disc (120 mm diameter). The solid layer is then coated for 20 minutes at 70° C. and a 60 nm thick gold layer is applied by sputtering. The disc is varnished according to Example 1. Using a CD-R burner (™HP 6020 Surestore), a video sequence of 19.4 MB is recorded on the recording substrate at a speed of 2.4 m/s. The information can be read out on a commercial CD-ROM drive.

What is claimed is:

1. An optical recording medium, comprising a substrate, a recording layer and a reflecting layer, where the recording layer comprises at least one dye of formula

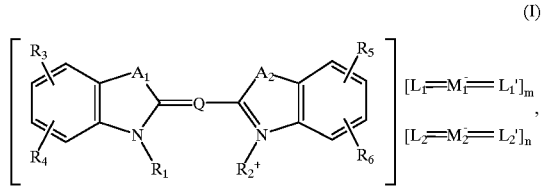
(I)

wherein $A_1$ and $A_2$ are each independently of the other $C(CH_3)_2$, O, S, Se, or CH=CH which is unsubstituted or substituted by $C_1$–$C_5$alkyl or benzyl;

$M_1$ and $M_2$ are each independently of the other $Cr^{3+}$ or $Co^{3+}$;

$L_1$ and $L_1'$ are each independently of the other a ligand dianion of formula

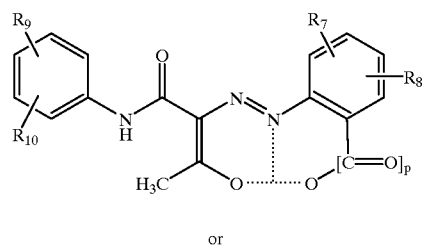
(II)

or

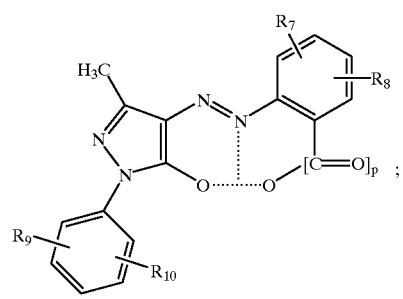
(III)

$L_2$ and $L_2'$ are each independently of the other and independently of $L_1$ and $L_1'$ a ligand dianion of formula

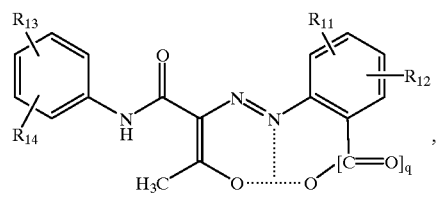
(IV)

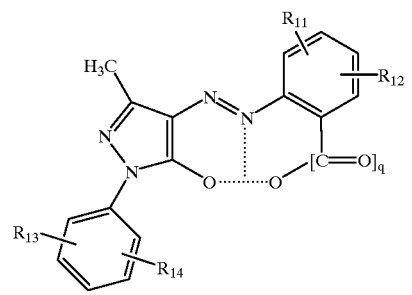
(V)

or

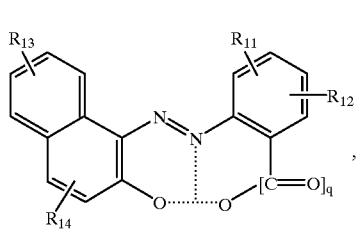
(VI)

m is a number from 0.2 to 1.0; and n, depending on m, is a number from 0.0 to 0.8, so that the sum of m and n equals 1.0;

p and q are each independently of the other 0 or 1;

Q is $CR_{15}$, $CR_{15}$—$CR_{16}$=$CR_{17}$ or $CR_{15}$—$CR_{16}$=$CR_{17}$—$CR_{18}$=$CR_{19}$;

$R_1$ and $R_2$ are each independently of the other $C_1$–$C_{12}$alkyl or $C_1$–$C_{12}$alkenyl, each of which is unsubstituted or mono- or polysubstituted by halogen, hydroxy, $C_1$–$C_{12}$alkoxy or cyano, or $C_6$–$C_{12}$aryl or $C_7$–$C_{12}$aralkyl, each of which is unsubstituted or substituted by $R_{20}$, or by $R_{20}$ and $R_{21}$;

$R_3$, $R_4$, $R_5$, $R_6$, $R_7$, $R_8$, $R_9$, $R_{10}$, $R_{11}$, $R_{12}$, $R_{13}$ and $R_{14}$ are each independently of one another hydrogen, halogen, nitro, cyano, hydroxy, amino, $NHR_{22}$, $NRR_{23}$, $CONH_2$, $CONHR_{22}$, $CONR_{22}R_{23}$, $SO_2C_1$–$C_{12}$alkyl, $SO_2NH_2$, $SO_2NHR_{22}$, $SO_2NR_{22}R_{23}$, COOH, $COOR_{24}$, $NHCOR_{25}$, $NR_{24}COR_{25}$, $NHCOOR_{25}$, $NR_{24}COOR_{25}$, or $C_1$–$C_{12}$alkyl, $C_1$–$C_{12}$alkylthio or $C_1$–$C_{12}$alkoxy which is unsubstituted or mono- or polysubstituted by halogen, hydroxy or cyano; or $R_3$ and $R_4$ and/or $R_5$ and $R_6$ together are 1,4-buta-1,3-dienylene which is unsubstituted or substituted by $R_{26}$, or by $R_{26}$ and $R_{27}$, so that naphthyl is formed with the shared phenyl;

$R_{15}$, $R_{16}$, $R_{17}$, $R_{18}$ and $R_{19}$ are each independently of one another hydrogen, halogen, $C_1$–$C_{12}$-alkoxy; $C_1$–$C_{12}$alkyl, $C_6$–$C_{12}$aryl, $C_7$–$C_{12}$aralkyl or $NR_{22}R_{23}$, each of which is unsubsubstituted or mono- or polysubstituted by halogen, hydroxy or cyano; or $R_{15}$ and $R_{17}$, $R_{16}$ and $R_{18}$ or $R_{17}$ and $R_{19}$ together are ethylene, ethylidene, propylene, propylidene, o-phenylene, α,2-benzylidene or 1,8-naphthylidene, each of which is unsubstituted or substituted by $R_{26}$, or by $R_{26}$ and $R_{27}$;

$R_{20}$ and $R_2$, are each independently of the other hydrogen, halogen, nitro, cyano, hydroxy, amino, $NHR_{22}$, $NR_{22}R_{23}$, $CONH_2$, $CONHR_{22}$, $CONR_{22}R_{23}$, $SO_2C_1$–$C_{12}$alkyl, $SO_2NH_2$, $SO_2NHR_{22}$, $SO_2NR_{22}R_{23}$, COOH, $COOR_{24}$, $NHCOR_{25}$, $NR_{24}COR_{25}$, $NHCOOR_{25}$, $NR_{24}COOR_{25}$, or $C_1-C_{12}$alkyl, $C_1-C_{12}$alkylthio or $C_1-C_{12}$alkoxy, each of which is unsubstituted or mono- or polysubstituted by halogen, hydroxy or cyano;

$R_{22}$ and $R_{23}$ are each independently of the other $C_1-C_{12}$alkyl or $C_2-C_{12}$alkenyl, each of which is unsubstituted or mono- or polysubstituted by halogen, hydroxy or $C_1-C_{12}$alkoxy, or $C_6-C_{12}$aryl or $C_7-C_{12}$aralkyl, each of which is unsubstituted or substituted by $R_{28}$, or by $R_{28}$ and $R_{27}$; or $R_{22}$ and $R_{23}$, together with the linking nitrogen atom, are pyrrolidine, piperidine, piperazine or morpholine, each of which is unsubstituted or substituted by one to four $C_1-C_4$alkyl, or carbazole, phenoxazine or phenothiazine, each of which is unsubstituted or substituted by $R_{26}$, or by $R_{26}$ and $R_{27}$;

$R_{24}$ and $R_{25}$ are each independently of the other $C_1-C_{12}$alkyl or $C_2-C_{12}$alkenyl, each of which is unsubstituted or mono- or polysubstituted by halogen, hydroxy or $C_1-C_{12}$alkoxy, or $C_6-C_{12}$aryl or $C_7-C_{12}$aralkyl, each of which is unsubstituted or substituted by $R_{26}$, or by $R_{26}$ and $R_{27}$;

$R_{26}$ and $R_{27}$ are each independently of the other halogen, nitro, cyano, hydroxy, $NR_{28}R_{29}$, $CONH_2$, $CONHR_{28}$, $CONR_{28}R_{29}$, $SO_2C_1-C_{12}$alkyl, $SO_2NR_{28}R_{29}$, COOH, $COOR_{30}$, $NHCOR_{31}$, $NHCOOR_{31}$, $NR_{30}COR_{31}$, $NR_{30}COOR_{31}$, or $C_1-C_{12}$alkyl or $C_1-C_{12}$alkoxy, each of which is unsubstituted or mono- or polysubstituted by halogen;

$R_{28}$ and $R_{29}$ are each independently of the other hydrogen, $C_6-C_{12}$aryl, $C_7-C_{12}$aralkyl; $C_1-C_{12}$-alkyl or $C_2-C_{12}$alkenyl, each of which is unsubstituted or mono- or polysubstituted by halogen, hydroxy or $C_1-C_{12}$alkoxy; or $R_{28}$ and $R_{29}$, together with the linking nitrogen atom, are pyrrolidine, piperidine, piperazine or morpholine, each of which is unsubstituted or substituted by one to four $C_1-C_4$alkyl, or carbazole, phenoxazine or phenothiazine; and $R_{30}$ and $R_{31}$ are each independently of the other $C_6-C_{12}$aryl, $C_7-C_{12}$aralkyl; $C_1-C_{12}$alkyl $C_2-C_{12}$alkenyl, each of which is unsubstituted or mono- or polysubstituted by halogen, hydroxy or $C_1-C_{12}$alkoxy.

2. A recording medium according to claim 1 wherein the recording layer comprises at least 60% by weight, based on the weight of the recording layer, of at least one compound of formula (I).

3. A recording medium according to claim 1 wherein the recording layer consists essentially of one or several dyes of formula (1), optionally of one or several optional organometallic compounds or metal complexes of transition metals in an amount of up to 50% by weight and optionally of one or several optional colourless salts in an amount of less than 20% by weight, each based on the total weight of the recording layer.

4. A recording medium according to claim 3, which comprises one or several colourless salts in amounts of up to 1% by weight.

5. A recording medium according to claim 3, wherein the recording layer essentially does not contain any additional inorganic salts.

6. A recording medium according to claim 1, wherein $L_2$ or $L_2'$ are of formula (IV) or (V).

7. A recording medium according to claim 1, wherein $M_1$ and $M_2$ are Co.

8. A recording medium according to claim 1, wherein p and q equal 0.

9. A recording medium according to claim 1, wherein Q is $CR_{15}$—$CR_{16}$=$CR_{17}$.

10. A recording medium according to claim 1, wherein $R_1$ and $R_2$ are each independently of the other $C_1-C_{12}$alkyl which is unsubstituted or mono- or polysubstituted by halogen, hydroxy or $C_1-C_{12}$alkoxy, or $C_7-C_{12}$aralkyl which is unsubstituted or substituted by $R_{20}$, or by $R_{20}$ and $R_{21}$; $R_{15}$, $R_{16}$, $R_{17}$, $R_{18}$ and $R_{19}$ are each independently of one another hydrogen, halogen, $C_1-C_4$alkyl or phenyl; and $R_3$, $R_4$, $R_5$ and $R_6$ are each independently of one another hydrogen, halogen, nitro, cyano, amino, $NHR_{22}$, $NR_{22}R_{23}$, $CONH_2$, $CONHR_{22}$, $CONR_2R_{23}$, COOH, $COOR_{24}$, $NHCOR_{25}$, $NR_{24}COR_{25}$, or $C_1-C_{12}$alkyl or $C_1-C_{12}$alkoxy, each of which is unsubstituted or mono- or polysubstituted by halogen, hydroxy or cyano; or $R_3$ and $R_4$ and/or $R_5$ and $R_6$ together are 1,4-buta-1,3-dienylene, so that naphthyl is formed with the shared phenyl.

11. A recording medium according to claim 1, wherein $R_7$, $R_8$, $R_9$, $R_{10}$, $R_{11}$, $R_{12}$, $R_{13}$ and $R_{14}$ are each independently of one another hydrogen, halogen, nitro, cyano, amino, $NHR_{22}$, $NR_{22}R_{23}$, $CONH_2$, $CONHR_{22}$, $CONR_{22}R_{23}$, $SO_2C_1-C_{12}$alkyl, $SO_2NH_2$, $SO_2NHR_{22}$, $COOR_{24}$, $NHCOR_{25}$, $NR_{24}COR_{25}$, or $C_1-C_{12}$alkyl or $C_1-C_{12}$alkoxy, each of which is unsubstituted or mono- or polysubstituted by halogen; $R_{20}$ and $R_2$, are each independently of the other hydrogen, halogen, nitro, cyano, amino, $NHR_{22}$, $NR_{22}R_{23}$, $NHCOR_{25}$, $NR_{24}COR_{25}$, $C_1-C_{12}$alkyl or $C_1-C_{12}$alkoxy; $R_{24}$ and $R_{25}$ are each independently of the other $C_1-C_{12}$alkyl, $C_2-C_{12}$alkenyl, $C_6-C_{12}$aryl or $C_7-C_{12}$aralkyl; and $R_{22}$ and $R_{23}$ are each independently of the other $C_1-C_{12}$alkyl, $C_2-C_{12}$alkenyl, $C_6-C_{12}$aryl or $C_7-C_{12}$aralkyl, each of which is unsubstituted or mono- or polysubstituted by $C_1-C_8$alkoxy, or $R_{22}$ and $R_{23}$, together with the linking nitrogen atom, is pyrrolidine, piperidine, piperazine or morpholine.

12. A recording medium according to claim 1, wherein at least one ligand dianion $L_1$, $L_1'$, $L_2$ or $L_2'$ is of formula

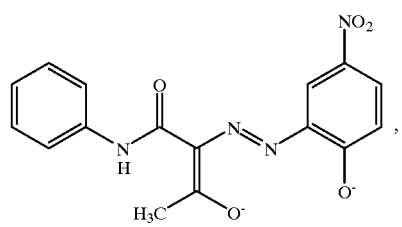

,

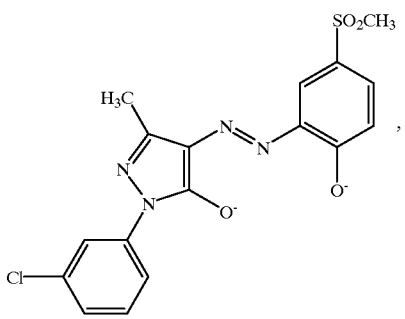

,

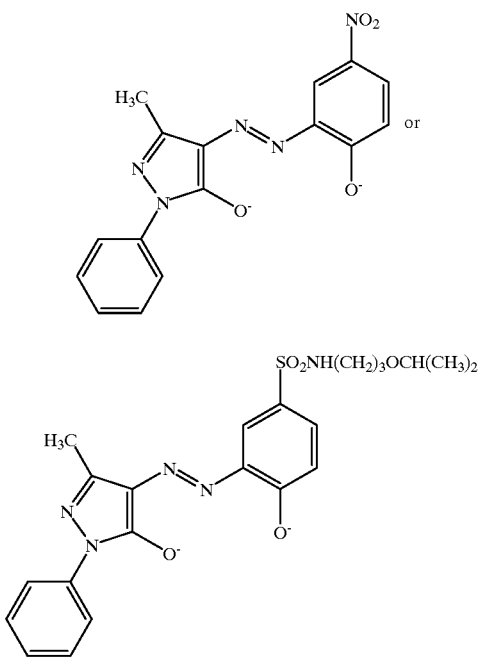

or

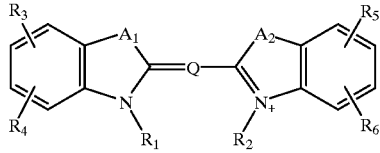

13. A recording medium according to claim 1, wherein $[L_1{=}M_1{=}L_1]^-$ and $[L_2{=}M_2{=}L_2]^-$ are structurally different and n is from 0.2 to 0.5.

14. A recording medium according to claim 1, which on the side of the coating has a spiral guide groove with a groove depth of 80 to 250 nm, a groove width of 0.3 to 0.5 μm and a spacing between 2 turns from 0.6 to 0.8 μm.

15. A process for optically recording, storing or reproducing information, which comprises using a recording medium as claimed in to claim 1.

16. A process according to claim 15; wherein recording is carried out at the wavelength range from 300 to 800 nm.

17. A process according to claim 15, wherein reproduction is carried out at the wavelength range from 600 to 800 nm.

18. A process according to claim 15, wherein recording and reproduction are carried out at the same wavelength range from 600 to 800 nm.

19. A recording medium according to claim 1, wherein the recording layer comprises, in addition to said at least one dye of formula (I), a fluoride, chloride, bromide, iodide, perchlorate, periodate, carbonate, hydrogencarbonate, sulfate, hydrogensulfate, phosphate, hydrogenphosphate, dihydrogenphosphate, hexafluorophosphate, tetrafluoroborate, hexafluoroantimonate, acetate, oxalate, mesylate, triflate, tosylate, methylsulfate, phenolate or benzoate of a cyanine of formula (VII)

$$[\text{structure}]$$

or a $Li^+$, $Na^+$, $K^+$, $[Mg^{2+}]_{1/2}$, $[Ca^{2+}]_{1/2}$, methylammonium, ethylammonium, pentadecylammonium, isopropylammonium, dicyclohexylammonium, tetramethylammonium, tetraethylammonium, tetrabutylammonium, benzyltrimethylammonium, benzyltriethylammonium, methyltrioctylammonium, tridodecylmethylammonium, tetrabutylphosphonium, tetraphenylphosphonium, butyltriphenylphosphonium or ethyltriphenylphosphonium salt of a metal azo complex of formula

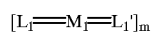 (VIII)

or

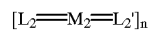 (IX)

in amounts of less than 20% by weight, based on the total weight of the recording layer, $A_1$, $A_2$, $L_1$, $L_2$, $L_1'$, $L_2'$, $M_1$, $M_2$, Q, R, to $R_6$ and m and n having the same meaning as claimed in claim 1.

* * * * *

UNITED STATES PATENT AND TRADEMARK OFFICE
CERTIFICATE OF CORRECTION

PATENT NO.  : 5,958,650
DATED       : September 28, 1999
INVENTOR(S) : Heinz Wolleb et al.

It is certified that error appears in the above-identified patent and that said Letters Patent is hereby corrected as shown below:

<u>Column 32,</u>
Line 41, should read -- nitro, cyano, hydroxy, amino, $NHR_{22}$, $NR_{22}R_{23}$, $CONH_2$, --.

<u>Column 33,</u>
Line 10, should read -- stituted by $R_{26,}$ or by $R_{26}$ and $R_{27;}$ or --.

<u>Column 34,</u>
Line 16, should read -- $CONH_2$, $CONHR_{22}$, $CONR_{22}R_{23}$, $COOH$, $COOR_{24}$, --.
Line 27, should read -- $SO_2$ $C_1$-$C_{12}$alkyl, $SO_2NH_{22}$, $SO_2NHR_{22}$, $COOH$, $COOR_{24}$, --.

<u>Column 35,</u>
Line 30, should read -- $[L_1=M_1=L_1']^-$ and $[L_2=M_2=L_2']^-$ are structurally different and n is from 0.2 to 0.5. --.

Signed and Sealed this

Twenty-fifth Day of February, 2003

JAMES E. ROGAN
*Director of the United States Patent and Trademark Office*